June 30, 1953  G. M. WALRAVEN ET AL  2,644,131
TIMING INDICATOR FOR INTERNAL-COMBUSTION ENGINES
Filed Oct. 1, 1948
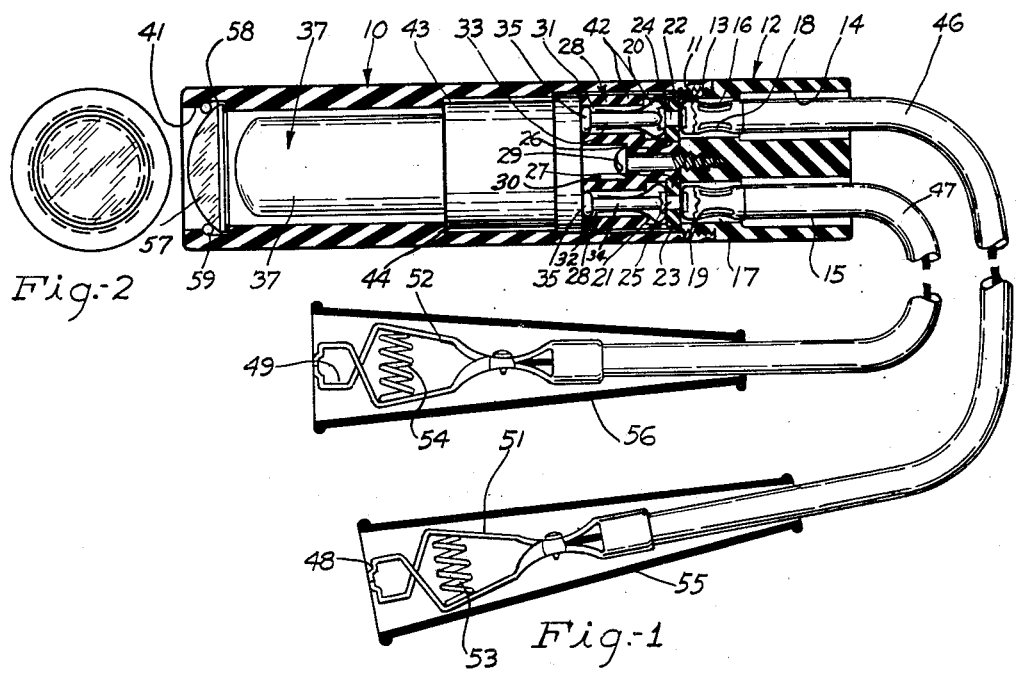
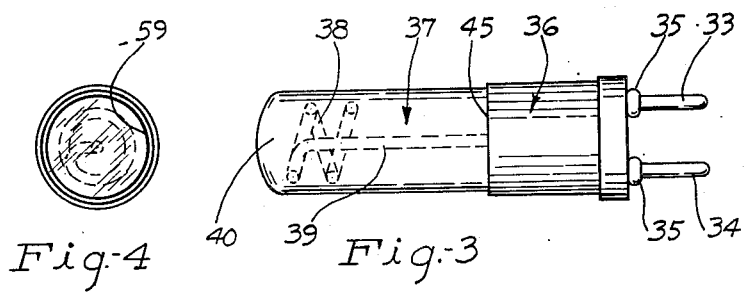
INVENTORS
GEORGE M. WALRAVEN
WILLIAM R. ELWELL
BY
ATTORNEY Patented June 30, 1953

2,644,131

UNITED STATES PATENT OFFICE 2,644,131

TIMING INDICATOR FOR INTERNAL-COMBUSTION ENGINES

George M. Walraven and William R. Elwell, Kenosha, Wis., assignors to Snap-On Tools Corporation, Kenosha, Wis., a corporation of Delaware Application October 1, 1948, Serial No. 52,268

1 Claim. (Cl. 324—17)

This invention relates to timing indicators for internal combustion engines and more particularly to visual indicators that test the sequence of firing in such engines, although certain features thereof may be employed with equal advantage for other purposes.

It contemplates more especially the provision of an improved, more compact, and simplified visual indicator for testing the firing sequence of internal combustion engines so that defects in engine operation may be determined without difficulty.

Visual indicators for testing the firing sequence of internal combustion engines are not basically new, but most of these devices which employ a neon tube or other type of illuminator are so constructed as a part of the testing equipment as to preclude renewal thereof. Furthermore, devices of this character are inclined to lack compactness and do not possess any special virtues in connection with the degree of illumination as well as the ability to replace the illuminator. With these deficiencies in mind, an improved and compact structural assembly has been provided which is more effective in operation and can be utilized over long periods of time by simply changing the illuminator when such becomes deficient.

One object of the present invention is to simplify the construction and improve the operation of devices of the character mentioned.

Another object is to provide an improved visual firing sequence indicator for internal combustion engines which is compact and inexpensive in construction.

Still another object is to provide an improved visual firing sequence indicator for internal combustion engines which has a readily replaceable illuminator of the neon type.

A further object is to provide an improved visual firing sequence indicator for internal combustion engines disposed behind a magnifying lens to provide a more distinct visual signal.

A still further object is to provide a compact visual indicator for determining the firing sequence of an internal combustion engine which is possessed of few parts in detachable association for enabling the replacement of illuminators that soon become impaired.

Still a further object is to provide an improved and more simple combination of elements which embodies a visual indicator and magnifying lens that are readily replaceable in conjunction with a socket for providing a compact timing device possessing improved characteristics.

Other objects and advantages will appear in the following description of an illustrative embodiment of the present invention.

In the drawing:

Figure 1 is a sectional view in elevation of a timing indicator embodying features of the present invention.

Figure 2 is an end view in elevation looking toward the magnifying lens of the device shown in Figure 1.

Figure 3 is a front view in elevation of a visual indicator such as a neon tube that is utilized as a timing indicator as shown in assembled position in Figure 1.

Figure 4 is an end view in elevation of the tube shown in Figure 3.

The structure selected for illustration is not intended to serve as a limitation upon the scope or teachings of the invention, but is merely illustrative thereof. There may be considerable variations and adaptations of all or part of the teachings depending upon the dictates of commercial practice.

The timing indicator comprises, in this instance, an elongated cylindrical tubular housing or casing 10 extruded or molded or otherwise shaped from an insulation material such as "Bakelite" or other dielectric material having electrical insulating characteristics. The tubular housing or casing 10 terminates at one extremity thereof in an enlarged internally threaded bore 11 that connects with a base member 12 constructed from similar material to provide a complemental peripheral shoulder 13 which is threaded to mesh with the internally threaded bore 11 of the housing 10 to establish a detachable connection therebetween.

The base 12 has parallel spaced passages 14—15, in this instance two, which communicate with slightly smaller recesses 16—17 provided in the peripheral shoulder region 13 of the base 12. Spring terminal clips 18—19 are disposed in the recesses 16—17 to project in the direction of the passages 14—15 in the base 12 for axial registry therewith while spring pressed prongs 20—21 extend oppositely thereto with insulator washers 22—23 disposed therebetween.

The opposed spring terminal clips 18—19 and prongs 20—21 are secured in axial alignment by means of axial rivets 24—25 that project through the bases of the terminals 18—19 and prongs 20—21 to maintain them in fixed opposed axial alignment with the passages 16—17 in the base 12.

As shown, the washers 24—25 are disposed in recesses 26—27 provided in a concentric extension 28 that extends from the base 12 in axial alignment therewith for connection thereto by means of a suitable fastener such as a screw 29 which is provided in an axial recess 30 of the base extension 28. The recess 30 communicates with an axial opening in the base extension 28 for accommodating the screw 29 that becomes anchored into the base 12 to connect the base extension 28 thereto.

It is to be noted that the spring pressed prongs 20—21 extend into parallel spaced apertures 31—32 in the base extension 28 to communicate with the top surface thereof so that pins 33—34 can be disposed for frictional grasp within the prongs 20—21 to establish contact with the rivets 24—25 that have connection with the terminal clips 18—19. As shown, the pins 33—34 have enlarged shoulders 35 which are provided on the shanks thereof to limit the position of the pins 33—34 with respect to a dielectrical base 36 comprising part of a neon illuminated tube 37.

It should be noted that the pins 33—34 constitute a permanent part of the neon tube 37 for connection with the illuminator heat elements 38—39 confined within the transparent shield 40 of the tube 37. Consequently, the neon tube 37 can be attached and detached from the base extension 28, and the housing 10 disposed thereover to protect the tube 37 and confine the light rays therefrom for emanation through the end opening 41 in the housing 10.

To this end, the tube 37 is displaced into the prongs 20—21 for electrical connection with the clip terminals 18—19, and thereafter the housing 10 is threadedly connected with the base 12 through the complemental threaded parts 11—13, respectively, thereof to confine the neon tube 37 in electrical and physical mounted connected relation with the base 12 against removal by the housing 10. This is rendered possible by providing the interior of the housing 10 with stepped annular recesses 42—43 which are somewhat greater in diameter than the correspondingly shaped base 36 of the neon tube 37 to accommodate the latter and still retain it against accidental removal by reason of the annular shoulder 44 within the housing 10 which rests against the peripheral edge 45 of the neon tube base 36.

With this arrangement, the base extension 28 becomes the socket for the neon tube base 36 whose pins 33—34 are electrically and physically connected to the spring terminals 18—19. Insulated lead wires 46—47 are provided with suitable terminals for frictional connection with the spring clip terminals 18—19 so that the insulated lead wires 46—47 can be readily connected or disconnected therefrom to establish electrical connection therewith.

The insulated lead wires 46—47 terminate in spring impelled terminal engaging test clips 48—49 of the separable type responsive to pressing the shanks 51—52 thereof together against the urge of their interposed springs 53—54, respectively. In order to shield the user from electrical shock, the spring impelled terminal engaging clips 48—49 together with their shanks 51—52 are shielded by flexible test clip insulators 55—56 of frusto-conical configuration in enveloping relation with the lead wires 46—47 and the test clips 48—49.

Consequently, the test clips 48—49 may be manually manipulated by pressing the test clip insulators 55—56 which in turn will transmit the finger action to the test clip shanks 51—52 to open the test clips 48—49 against the urge of the springs 53—54. The test clips 48—49 will permit the ready connection thereof to a spark plug of an engine as well as to the portion of the engine block or other grounded portion of the engine frame to indicate the firing order as the flywheel reaches a predetermined rotary position.

The visual indicator such as the neon tube 37 will become illuminated as the spark plug fires, at which time the attendant determines the position of the flywheel in connection with the firing of the spark plug to determine the proper engine timing and firing of the spark plugs. This visual indication may be enhanced or accentuated by providing a magnifying lens 57 in an annulus 58 provided within the housing 10 proximate to the open end 41 therein. The magnifying lens 57 is held in position by means of a split ring 59 to releasably retain the magnifying lens 57 in assembled relation with the housing 10 near the open end 41 therein.

It will be observed, therefore, that improved visual indication results of such an arrangement of parts which are compactly confined within the housing 10 which has a base 12 detachably connected therewith. The neon tube 37 constituting the visual indicator is readily replaceable with respect to the socket or base extension 28 so that renewal of the improved parts may be effected without much expense or delay.

While we have illustrated and described a preferred embodiment of this invention, it must be understood that the invention is capable of considerable variation and modification without departing from the spirit of the invention. We, therefore, do not wish to be limited to the precise details of construction set forth but desire to avail ourselves of such variations and modifications as come within the scope of the appended claim.

We claim:

In an engine timing indicator, the combination with a cylindrical casing having sectional complemental socket and light encasing parts, of spring pressed prong terminal clips in said socket, a visual indicator light having terminal prongs complemental to said spring pressed prong terminal clips detachably mounted to said socket for confinement in said light encasing part, a magnifying lens detachably mounted in the light encasing part of said casing to protect said visual light indicator and accentuate the signal therefrom, a base having lead terminal clips therein, said base being detachably connected to said socket and prong terminal clips in said socket, and wire leads detachably connected to said socket base terminal clips from the exterior end thereof.

GEORGE M. WALRAVEN.
WILLIAM R. ELWELL.

References Cited in the file of this patent

UNITED STATES PATENTS

| Number | Name | Date |
|--------|------|------|
| 896,300 | Jarvis | Aug. 18, 1908 |
| 1,158,578 | Stearns | Nov. 2, 1915 |
| 1,886,326 | Cadieux | Nov. 1, 1932 |
| 2,006,341 | Berg et al. | July 2, 1935 |
| 2,039,214 | Eaton | Apr. 28, 1936 |
| 2,231,660 | Carlotti et al. | Feb. 11, 1941 |
| 2,302,248 | Olson | Nov. 17, 1942 |
| 2,337,237 | Garberding | Dec. 21, 1943 |